United States Patent [19]
Smith

[11] Patent Number: 6,128,094
[45] Date of Patent: Oct. 3, 2000

[54] PRINTER HAVING PROCESSOR WITH INSTRUCTION CACHE AND COMPRESSED PROGRAM STORE

[75] Inventor: Kenneth K. Smith, Boise, Id.

[73] Assignee: Hewlett-Packard Company, Palo Alto, Calif.

[21] Appl. No.: 09/112,104

[22] Filed: Jul. 8, 1998

[51] Int. Cl.[7] .................................................. G06F 15/00
[52] U.S. Cl. ...................... 358/1.15; 358/1.16; 358/1.17
[58] Field of Search .................... 358/1.1, 1.13, 358/1.14, 1.15, 1.16, 1.18, 296, 400, 450, 404

[56] References Cited

U.S. PATENT DOCUMENTS

| | | | |
|---|---|---|---|
| 4,847,902 | 7/1989 | Hampson | 713/190 |
| 5,450,562 | 9/1995 | Rosenberg et al. | 711/119 |
| 5,502,550 | 3/1996 | Hori et al. | 355/246 |
| 5,729,668 | 3/1998 | Claflin et al. | 358/1.15 |
| 5,737,503 | 4/1998 | Mitani | 358/1.16 |
| 5,794,094 | 8/1998 | Boockholdt et al. | 399/27 |
| 5,959,744 | 9/1999 | Kohri et al. | 358/296 |

OTHER PUBLICATIONS

U.K. Search Report, Sep. 8, 1999.

*Primary Examiner*—Edward L. Coles
*Assistant Examiner*—Mark Wallerson

[57] ABSTRACT

A printer provides additional read/write memory for image processing by operating with stored programs in compressed form. When needed for execution, instructions of a compressed program are expanded by a decompression circuit on the fly in an instruction cache. In a preferred embodiment, the instruction cache includes dynamic random access memory (DRAM). Further, the processor for executing the expanded instructions, the decompression circuit, and the instruction cache are integrated together on the same chip. A printer having a processor for formatting incoming data in a page description language (PDL), for example, executes the instructions of the PDL interpreter program from the cache while the PDL program as a whole is stored in compressed format in off-chip ROM or received from an external computer (downloaded) into off-chip RAM.

18 Claims, 4 Drawing Sheets

PRINTER HAVING PROCESSOR WITH INSTRUCTION CACHE AND COMPRESSED PROGRAM STORE

FIELD OF THE INVENTION

This invention relates to a printer having a processor that executes a program stored in memory in the printer, and to systems and methods of executing stored program instructions.

BACKGROUND OF THE INVENTION

A conventional laser printer generally includes a print engine, an input interface for receiving data to be printed, and a processor that supplies data to the print engine in response to the received input data. The input data conventionally includes instructions conforming to a page description language (PDL), such as PCL printer control language, marketed by Hewlett Packard, or the Postscript page description language, marketed by Adobe Systems. Due to the variety of instructions available in a PDL, a program written to process PDL instructions (a PDL interpreter) is usually fairly large, for example, on the order of 2 MByte. Storage of such a PDL interpreter program is conventionally provided in the printer in read only memory (ROM).

Generally two types of memory are used in the conventional laser printer. Programs having instructions to be executed by the processor, for example, may be stored in ROM or read/write memory; while variables used by the program (including data received to be printed) is stored in read/write memory. Memory systems are expandable so that the factory or user may add support for "built-in" features by adding additional preprogrammed ROM modules. Support for processing large amounts of data to be printed on a single sheet may be expanded by the factory or user by adding random access memory (RAM) modules for the read/write memory functions.

Generally, ROM access time is longer than the access time for RAM. Therefore, program instructions fetched from a ROM (e.g. for a PDL interpreter) will execute slower than program instructions fetched from a RAM. RAM, however, generally costs more than ROM. Although a user may add RAM to a printer, for example, to print complex images and to store a downloaded PDL interpreter (located in RAM for higher execution speed) the PDL interpreter may take up a great deal of RAM, offsetting the ability of the printer to print complex images.

Without methods and systems of the present invention, the ability of a user to expand the capability of a printer will be limited. Users expect printers to print more complex images and interpret more complex PDLs. Cost and system reliability constraints, among other factors, limit the ability to meet these demands by simply adding RAM. Without the ability to expand printer capability in response to system software expansion, conventional printers become obsolete too quickly.

In view of the problems described above and related problems, the need remains particularly in printers, and generally in processors, for systems and methods of efficiently storing and executing programs.

SUMMARY OF THE INVENTION

A printer in one embodiment of the present invention includes a memory, a buffer, and a formatter. The memory stores a program in compressed form. The buffer receives input data from a provided computer. The formatter is coupled to the memory and to the buffer and determines an image in response to the input data. The formatter includes a decompressor, a cache, and a processor. The formatter receives at least a portion of the program from the memory and decompresses the portion to provide an instruction. The cache receives and stores the instruction. The processor receives the instruction from the cache and determines the image by executing the instruction. The print engine prints the image as determined by the formatter.

According to a first aspect of such an embodiment, storage of the program in memory requires less address space. Consequently, the printer may be provided at the same cost with more or longer programs, or the amount of memory may be reduced to reduce the cost of manufacturing the printer.

According to a second aspect, execution of the program fetched from the cache is faster than execution of an expanded program fetched from the memory. When the fetch access time for cache is much faster than the fetch access time for memory, a time savings develops that is more than sufficient for decompression, leaving a substantial net execution time savings.

According to another aspect, execution of a program for interpreting input data for forming an image to be printed is faster when program instructions are fetched from cache instead of being fetched from memory. Faster execution time permits a higher printing rate with respect to the same interpretation requirement or permits an alternate more sophisticated interpretation without adversely affecting the printing rate.

An integrated circuit in one embodiment of the present invention includes a processor and a cache. The processor provides an address for fetching an executable instruction. The cache provides the executable instruction in response to the address. The cache includes a memory and a decompressor. The decompressor reads a table and an information block from a provided system memory. The table includes a plurality of rows. Each row corresponds to a respective tag value taken from a series of tag values. Each row also identifies a respective code block value. The information block includes a data item. The decompressor stores in the cache memory a copy of the respective code block value of a selected row of the table. The selected row has a tag value identified by the data item. The code block includes the executable instruction and has more bits than the data item. A net decompression results from the substitution of the code block value for the data item.

According to an aspect, of such an embodiment, storage of the program in the provided memory requires less address space. Consequently, systems using the integrated circuit may be provided at the same cost with more or longer programs, or the amount of system memory may be reduced to reduce the cost of systems manufacturing.

According to a second aspect, execution of the program fetched from the cache is faster than execution of an expanded program fetched from system memory. When the fetch access time for cache is much faster than the fetch access time for system memory, a time savings develops that is more than sufficient for decompression, leaving a substantial net execution time savings.

Another embodiment of the present invention provides a method for storing a series of executable instructions for later execution from a cache.

The method includes the steps of determining a pattern size; dividing the series of instructions into a series of code blocks, each code block having a respective code block value and having the pattern size; for each occurrence of a code block value in the series of instructions, incrementing a respective count associated with the respective code block value; determining a series of tag values, forming a table having a row for each tag value, and determining a tag value having no corresponding row; interactively selecting the maximum unselected count and placing in the table for a respective tag value the respective code block value, until all rows have been filled; determining a series of information blocks by interactively reading in series a code block from the series of code blocks and, for each code block value that corresponds to a row of the table, identifying in the information block the tag value of the corresponding row, and otherwise, when no corresponding row exists in the table, identifying in the information block the tag value having no corresponding row followed by the respective code block value; and storing the table and the series of information blocks in a memory for access by a decompressor that writes the cache in response to code block values of the table and to code block values of the information blocks, so that the cache contains executable instructions.

According to a first aspect of such a method, the resulting information blocks occupy less space than the series of instructions. A net compression is achieved with consequent savings in the cost of storing the series of instructions.

According to another aspect, because the number of bits in the pattern size may vary from the number of bits in one instruction, recurring groups of instructions may be recognized for compression, or recurring subsets of bits in several instructions may be recognized for compression.

DESCRIPTION OF THE DRAWINGS

Preferred exemplary embodiments of the present invention are described below with reference to the drawing in which.

In each functional block diagram, a broad arrow symbolically represents a group of signals that together signify a binary code. For example, a group of address lines is represented by a broad arrow because a binary address is signified by the signals taken together at an instant in time. An arrow between functional blocks represents one or more signals.

DETAILED DESCRIPTION OF THE PREFERRED EMBODIMENT

An apparatus according to aspects of the present invention executes a program that is stored in a compressed format. Execution proceeds after wholesale or piece-wise decompression of the program. Accordingly, particular synergies are obtained in a computer system or computer peripheral that has limited internal memory for performing data processing tasks. For example, when memory size is limited, many peripheral data processing tasks may for example operate slower, produce less accurate results, cause interruptions in processing (as in a memory-out condition failure), or fail to accommodate complete processing of a series of tasks presented in a given period of time.

According to aspects of the present invention, computer systems and computer peripherals vary in complexity for serving a wide range of data processing functions, such as physical monitoring and measurement, special purpose data analysis, process control, printing, plotting, data recording, display, and network communication, to name a few. Such systems and peripherals have an internal functional architecture that includes a processor (e.g. CPU), a read/write memory (e.g. RAM) having limited size, a program storage memory (e.g. ROM) having limited size, and an instruction cache. These functional elements are coupled in a conventional manner for retrieving information from the ROM, decompressing such information to provide program instructions in the instruction cache, and executing them in the CPU to affect the values of variables in RAM or to produce output signals.

Figure 1:
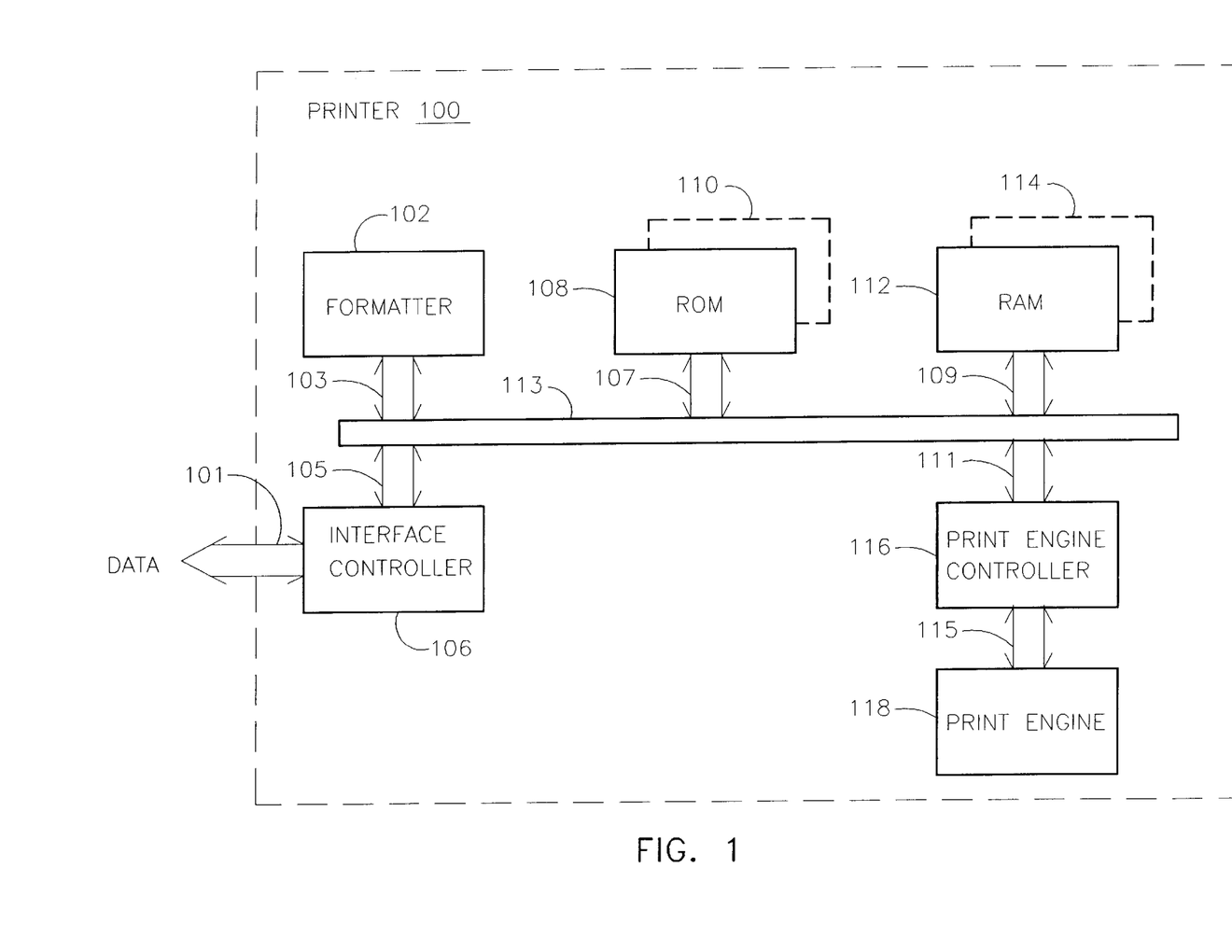
FIG. 1 is a functional block diagram of a printer according to aspects of the present invention.

Printer 100 of FIG. 1 is an example of such a computer peripheral. A computer (not shown) uses printer 100 as a peripheral. The computer describes an image to be printed using PDL Commands (DATA) on line 101. Printer 100 primarily includes interface controller 1106, bus 113, formatter 102, ROM 108, RAM 112, print engine 116, and print engine 118.

Interface controller 106, formed of any conventional digital circuitry, receives signal DATA on line 101 into a buffer and, by supporting a conventional interface protocol, determines information to be passed to formatter 102 via conventional lines 105, 103, and bus 113. Interface controller 106 also responds to commands (e.g., related to an interface protocol) from formatter 102 and provides status and control signals (not shown) on line 101.

Print engine 118 may include any conventional printing apparatus (e.g., of the type using an ink jet device or a laser printing device) that is responsive to digital signals for recording text or graphics on a print media (e.g., paper or film). When print engine 118 includes a raster printing device, data in scan line format is determined by formatter 102 and passed via conventional lines 103, 111, 115, bus 113, and print engine controller 116, to print engine 118 for printing.

Print engine controller 116 may include any digital and/or analog circuitry for supplying data and control signals on line 115 to print engine 118 and for responding to status signals from print engine 118 on line 115. Status information is communicated to formatter 102 in a conventional manner. An alternate print engine controller includes direct memory access (DMA) circuitry that reads data from ROM 108 and RAM 112 to be printed and writes status to RAM 112 without intervention by formatter 102. An alternate formatter includes such DMA circuitry.

Memory used in printer 100 includes any combination of conventional read/write and read only memory circuitry and provides storage for variables and software (including fixed data items and program instructions).

For example, printer 100 includes RAM 112, expandable with RAM 114, for storage of variables; and includes ROM 108, expandable with ROM 110. ROM 108 provides economical storage for a large amount of built-in software including fixed data items (e.g. fonts) and programs. Some or all of the built-in software may be compressed. Any conventional memory circuitry may be used to implement ROM 108 and 112 including static mask ROM, electrically erasable programmable memory devices, and battery-backed dynamic random access memory devices, to name a few common types. RAM 114 provides storage for data and may include a portion of software in compressed or uncompressed format. In operation, downloaded software from interface controller 106 may be stored in RAM 114 in compressed or uncompressed format.

A formatter according to aspects of the present invention may include any digital computer circuit for controlling printer operation that performs a stored program, a portion of which is stored in a compressed format. For example, formatter 102 controls and coordinates nearly all functions of printer 100 and formats data received via signal DATA into scan lines for print engine 118. Formatter 102 performs program instructions that have been stored in ROM 108 (or 110) or in RAM 112 (or 114) in a compressed form. In a variation, additional special purpose digital computer circuits may be coupled to bus 113 for additional or improved computational capability, process monitoring, or print engine control. Conventional computing circuits for executing a stored program include microprocessor-based and microcontroller-based circuits of the type conventionally implemented on printed circuit boards or on an application specific integrated circuit (ASIC). Microprocessors and microcontrollers conventionally include an on-chip data cache and an on-chip instruction cache, each of limited depth. These conventional on-chip (level 1) caches do not contain program instructions in a compressed format.

Figure 2:
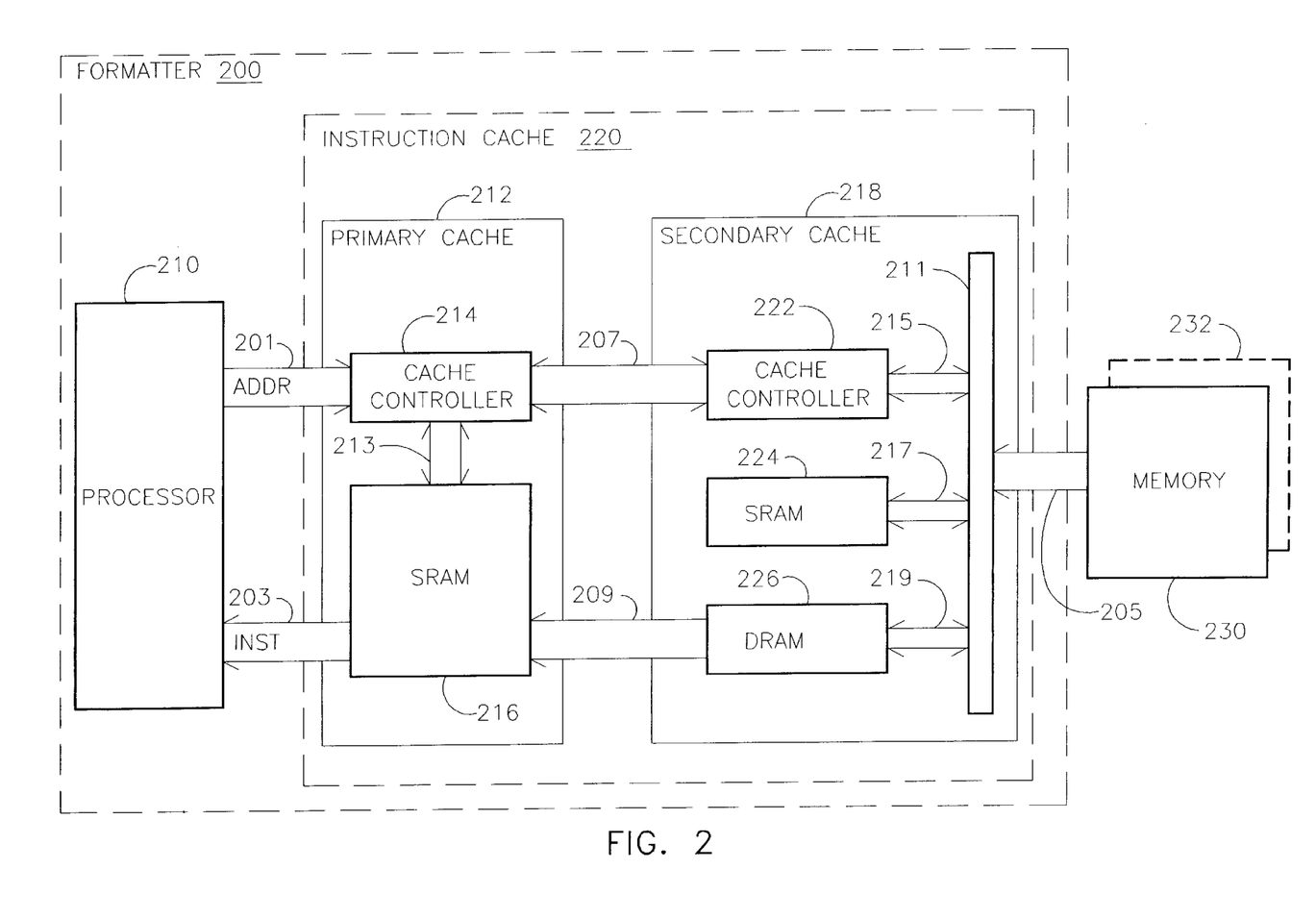
FIG. 2 is a functional block diagram of a portion of the formatter of FIG. 1.

An example of a portion of formatter 102 implemented as an ASIC 200 is shown in FIG. 2. ASIC 200 is formed by conventional techniques and designed using, for example, standard cell and/or custom integrated circuit techniques. ASIC 200 primarily includes processor 210 and instruction cache 220. Processor 210 includes conventional circuits; (not shown) for data cache, bus control, I/O control, data memory management, and power consumption management. In one variation, processor 210 includes processor megacell 960 marketed by Intel.

Processor 210 cooperates with an instruction cache for high speed access to compressed instructions stored in memory 230 (or 232). Memory 230 includes ROM 108 and 110 and/or RAM 112 and 114, with contents as described above. Conventional lines 103, 113, 107 and 109 are collectively shown as line 205. An instruction cache may include any circuit that cooperates with a processor and a memory to respond to a stream of memory addresses by providing to the processor a corresponding stream of instructions in a shorter access time than would otherwise be realized had the processor obtained each instruction directly from memory. An instruction cache according to aspects of the present invention additionally decompresses information stored in memory to determine the corresponding stream of instructions.

For example, instruction cache 220 includes primary cache 212 and secondary cache 218. Primary cache 212 includes high-speed static random access memory (SRAM) 216 and cache controller 214. Secondary cache 218 includes dynamic random access memory (DRAM) 226, SRAM 224, cache controller 222, and bus 211. Cache controller 222 includes a decompressor having a conventional state machine architecture adapted for operations described below. Line 213 provides data communication between cache controller 214 and SRAM 216. Bus 211 provides data communication among cache controller 222 via line 215, SRAM 224 via line 217, DRAM 226 via line 219, and off-chip memory 230 via line 205. The respective widths (number of parallel bit signals) of bus 211 and lines 215, 217, 219, and 209 are not necessarily identical or similar to the width of line 205. In a preferred version of formatter 200, bus 211 and lines 209, 219, 217, and 215 are from 64 to 512 bits wide, preferably 128 bits wide; whereas, line 209 is less wide, for example 32 bits wide.

In operation, primary cache 212 operates as a conventional on-chip cache and as follows: (1) when cache controller 214 determines that the address provided by signal ADDR on line 201 requests a corresponding instruction that is currently available in SRAM 216 (a cache hit), cache controller 214 provides the corresponding instruction by signal INST from SRAM 216; and (2) when cache controller 214 cannot satisfy the address from SRAM 216 (a cache miss), cache controller 214, on line 207, provides the starting address of a group of addresses to secondary cache 218 with a request for instructions that will include the corresponding instruction. Cache controller 214 manages use of SRAM 216 for freeing space taken up by instructions that are unlikely to be requested (i.e. fetched) and for filling free space to minimize the probability of a cache miss. According to aspects of the present invention, SRAM 216 includes space sufficient for assuring a high hit rate based on expected processor address sequences, access time for SRAM 216, and the expected response time of secondary cache 218.

In a variation of instruction cache 220, primary cache 212 is omitted with corresponding savings in ASIC surface area, power consumption, and complexity. When omitted, signal ADDR is presented to secondary cache controller 222 on line 207 and signal INST is presented from DRAM 226 to processor 210 on line 209.

A secondary cache according to aspects of the present invention provides conventional level 2 cache functions (typically with larger blocks of instructions than a level 1 cache) and decompresses information blocks read from memory in a compressed format. For example, secondary cache 218 operates as follows: (1) when cache controller 222 determines that the address provided by the signal on line 207 requests a corresponding instruction that is currently available in DRAM 226 (a cache hit), cache controller 222 provides the corresponding instruction from DRAM 226; and (2) when cache controller 222 cannot satisfy the address from DRAM 226 (a cache miss), cache controller 222 performs a method for fetching an instruction having a compressed format.

Such a method may include any sequence of steps that provides from information in a compressed format a result in a native instruction format (as needed for direct execution by a processor). In general, information in a compressed format will occupy fewer memory addresses than corresponding instructions in an executable format. The ratio of the respective quantities of memory addresses (instructions/ information) is conventionally called a compression ratio.

Compression ratios of about 2:1 are feasible for some conventional compression algorithms as applied to particular blocks or instructions. Cache controller 222 includes a decompressor that performs any conventional decompression algorithm. For example, a preferred algorithm of the type generally known as a Huffman algorithm, when applied to a typical block of 256K bytes of instructions in 960 processor execution format may have a compression ratio of from 1.8:1 to 3.6:1 depending on the number of entries in the table used for compression and decompression. In variations of the present invention, versions of the known GZip or Limpel Ziv Welch (LZW) algorithms are used in the decompressor with greater or less compression ratios depending on the particular instructions being compressed. The choice of algorithm for a particular application will depend on circuit complexity of cache controller 222 and the relative sizes and access times of cache memory (216, 224, 226) and system memory (230, 232).

The decompressor performs a method of operation in cooperation with cache memory and system memory in any manner to provide executable instructions on line 209 in response to requests on line 207 and corresponding information in memory 230. A portion of such a method of operation, for example, method 300 in FIG. 3, responds to a miss event of primary cache 212 by providing a code block value in i960 native instruction format derived from information in a compressed format. The provided code block is stored in DRAM 226 for transfer as needed on line 209 to SRAM 216. Cache controllers 214 and 222 cooperate in a conventional manner upon completion of method 300 to provide signal INST on line 203.

Figure 3:
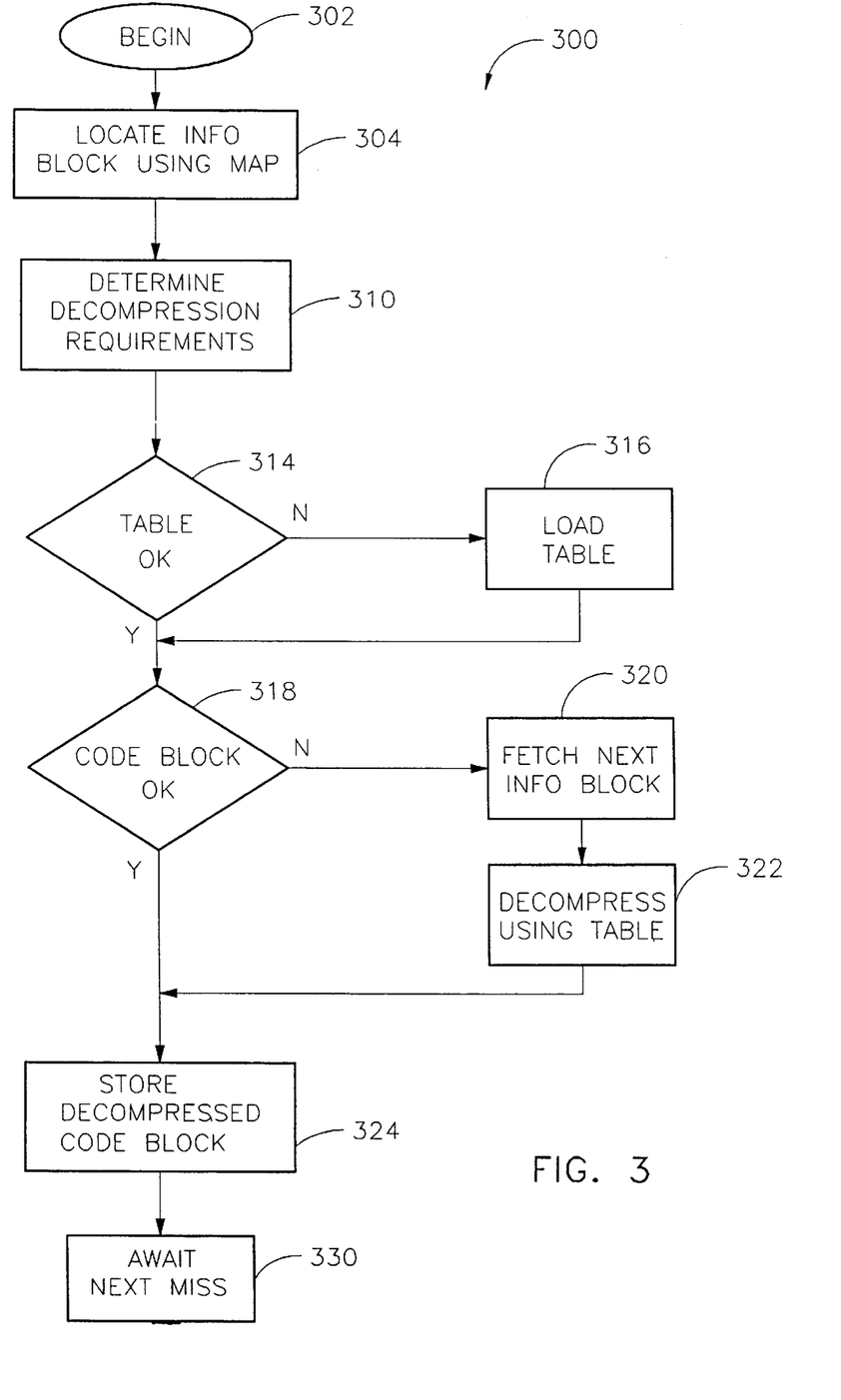
FIG. 3 is a flow chart of a method performed by the processor of FIG. 2.

In steps 304 and 310, cache controller 222 uses a MAP to determine what address in memory 230 contains appropriate information, then determines the format of the information in memory 230 at that address: whether decompressed or compressed, and if compressed, the location of TABLE information (if any) that may be needed for decompression. The MAP and TABLE data are preferably stored in a conventional manner in SRAM 224 for rapid access by cache controller 222.

As discussed above, memory 230 includes uncompressed and compressed information. Uncompressed information may include information for the MAP, information for the TABLE, and uncompressed code blocks. Compressed information includes simple or compound information blocks, described below.

When information for the MAP is transferred from memory 230 to SRAM 224, the MAP may be stored as an array in uncompressed format. Each row identifies an address range for decompressing a code block. When the address specified by cache controller 214 on line 207 is found to be within a range specified by a particular row, the various columns in the array for that row identify information sufficient for decompression. This column information may include, for example, a one-bit flag indicating format as compressed/uncompressed; an offset to a starting address and a length (or an offset to a stop address) in memory 230 that together define an information block to be used as is (for uncompressed format) or as an input for decompression (for compressed format); and an offset to a starting address in memory 230 that identifies the appropriate contents for the TABLE. In variations, the information in memory 230 is organized in variable length structures, in a linked format using pointers, or a conventional linked list. A linked list provides a hierarchical organization for locating information (of varying length) corresponding to a random address with fewer arithmetic comparisons.

Cache controller 222 may include a conventional translation look-aside buffer to convert the requested address to an information block start address and an offset address within the corresponding decompressed code block value.

At step 314, cache controller 222 determines whether the contents of the TABLE stored in SRAM 224 are OK as is or must be replaced with uncompressed information from memory 230. The identity of the contents of a TABLE stored in SRAM 224 may be held in a register as an address in memory 230 that defines the appropriate contents for the TABLE. If a discrepancy exists between TABLE identities given by the register and the MAP, control passes to step 316 where new TABLE values are read from memory 230. Otherwise, no change is made to values in the TABLE and control passes to step 318.

Any number of TABLE entries may be used. It is preferred to use $2^N-1$ entries, each entry corresponding to an ordinary tag value. A special tag value is reserved to indicate that no decompression is needed. Each ordinary tag value may be used to identify a code block of instructions in native format to be substituted for compressed information during the process of decompression.

When information for the TABLE is transferred from memory 230 to SRAM 224, the TABLE may be stored as an array in uncompressed format. Each entry of the TABLE forms a row and identifies a first data item (e.g. a short tag) and a second data item (e.g. an uncompressed code block value also called a code block). In a variation, each address in a range of addresses in SRAM 224 corresponds to an ordinary tag value, to avoid storing tag values in SRAM 224. In another variation, pointers are used to permit reference to second data items of nonuniform length. In yet another variation, the structure of the TABLE is made similar to the structure of the MAP for economies in decompressor circuit size.

At step 318, cache controller 222 determines whether information in memory 230 that corresponds to the requested address (from signal ADDR) should be decompressed or transferred without decompression. If no decompression is needed, control passes to step 324. Otherwise, control passes to step 320. The code block of which the requested address is a part may include a partial instruction, a complete instruction, or any number of instructions in native format. Code block size is determined for optimum system performance (e.g. instruction fetch latency as seen by processor 210) based on the read/write cycle timing for SRAM 216, DRAM 219, SRAM 224, and memory 230, and the capacity and word size of these memories. Page mode read and write operations are performed by the decompressor in a preferred variation for some or all of the operations with some or all of these memories.

At step 322 a simple or compound information block is read from memory 230. A simple information block consists of either an ordinary tag value by itself, or a special tag value followed by an uncompressed code block value. A compound information block consists of a series of simple information blocks. For each ordinary tag value, the decompressor identifies a corresponding code block value in the TABLE. For each special tag value the decompressor identifies the code block value that follows the special tag value.

At step 324, the identified code block in uncompressed format is stored in DRAM 226. When control passes from step 318 to step 324, the code block from memory 230 is transferred directly to DRAM 226. When control passes from step 322 to step 324, the output of the decompressor is stored in DRAM 226. In a preferred variation, a compound information block is read, decompressed, and stored in a pipeline manner. For example, during each consecutive read cycle of memory 230, a tag is identified and the corresponding code block is transferred either from memory or from the TABLE to an appropriate location in DRAM 226. In another variation, code blocks are returned to a read/write portion of memory 230 and the corresponding MAP entry is updated to redirect access there. In yet another variation, all compressed code blocks are decompressed and stored in memory 230 on system initialization or on any first request so that execution of instructions in native format is uninterrupted by decompression.

DRAM 226 now contains instructions in native format including the instruction requested by cache controller 214. Subsequent requests for this instruction will not cause a secondary cache miss, unless cache controller 222, prior to the request, determines that the instruction is not likely to be used and proceeds to reuse the space in DRAM 226 for another uncompressed code block. When a portion of DRAM 226 is to be reused, cache controller 222 updates the MAP stored in SRAM 224 to indicate that the heretofore available code block no longer exists in DRAM 226.

At step 330, cache controller 222 awaits the next occurring secondary cache miss, whereupon processing continues from step 302. In a variation, read/write portions of memory 230 are reserved by cache controller 222 and used for storage of decompression results in advance of requests for particular addresses, thereby improving instruction fetch latency at the expense of interfering with other possible uses of memory 230.

Figure 4:
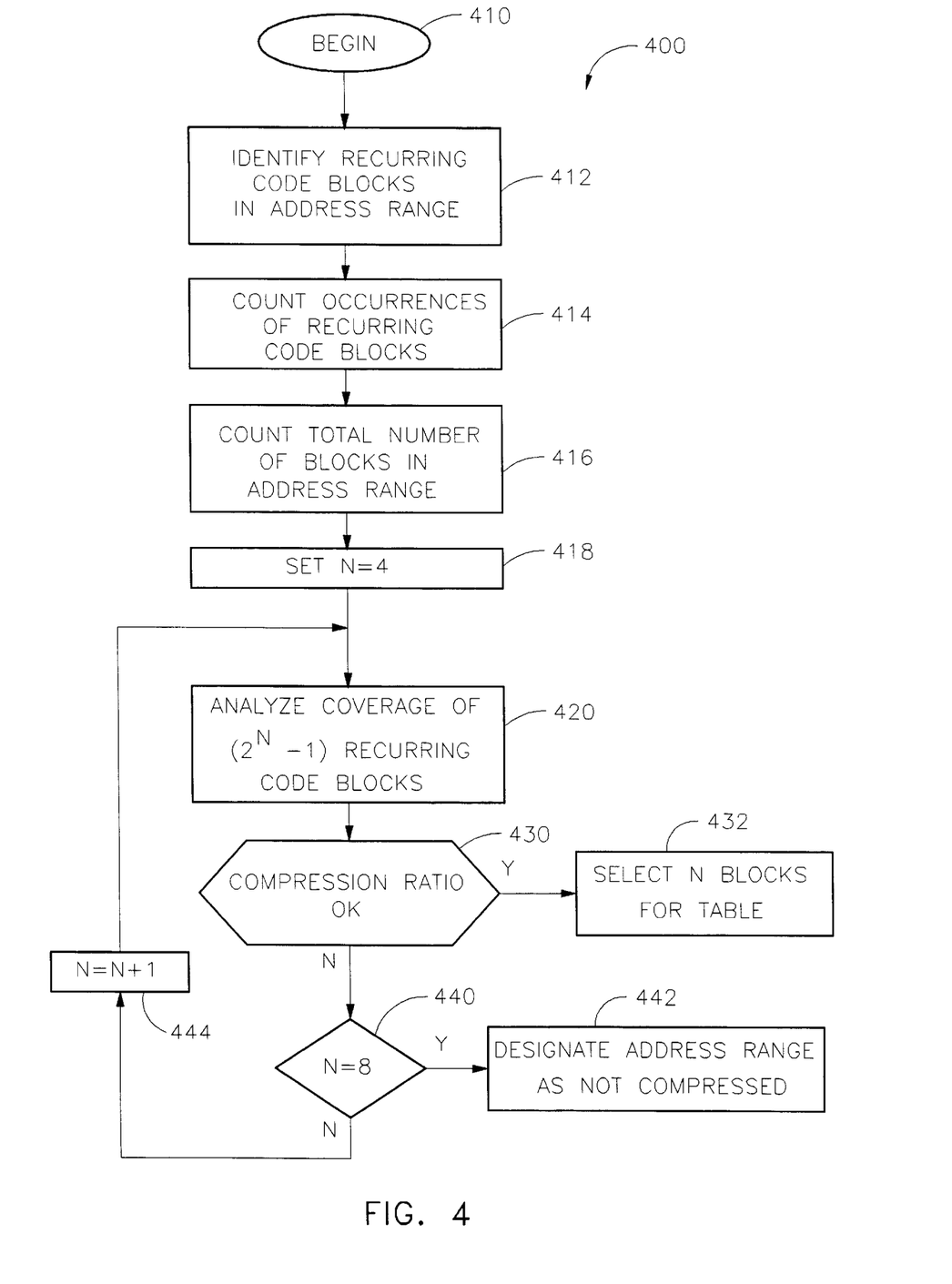
FIG. 4 is a method for developing data to be stored in the ROM of FIG. 1.

Prior to including data in memory 230 or 232 as information stored in compressed format (whether downloaded or installed in preprogrammed expansion circuitry 232), such data may be analyzed for determining a desirable compression ratio. Any method of analyzing such data may be used that accomplishes the desired compression ratio. As a result of the analysis, any prerequisites for decompression (for example, as in step 310) may also be determined. For example, method 400 of FIG. 4 is a method for analyzing a compression ratio and determining values for the TABLE stored in SRAM 224 as a prerequisite for the preferred Huffman compression/decompression method discussed above.

At step 412, all instructions in an address range are reviewed. During the review, when a pattern is found to occur more than once in the address range, the pattern is identified with both a tag value and an uncompressed code block value in a temporary array which may be similar to the TABLE discussed above. A minimum pattern length is set (for example 16 words) to improve efficiency of the review. Any series of bits, bytes, or words may comprise the pattern (i.e., a code block).

At step 414, a count is made of the number of occurrences for each recurring code block. Each count is stored in the temporary array.

At step 416, a count is made of all code blocks in the address range. When this count is multiplied by the number of bits in a code block, the product indicates a numerator value for a compression ratio.

At step 418, a loop variable "N" is set to an initial value, for example 4. The initial value is selected to optimize the size and speed of operation of secondary cache 218. The initial value may be any convenient minimum number, for example, between 1 and 20.

Steps 420, 430, 440, and 444 form a loop. At step 420, an analysis is made of the coverage of $(2^N-1)$ recurring code blocks. In other words, a hypothesis that an acceptable compression ratio will be met with a TABLE having $(2^N-1)$ rows is made. A selection of the $(2^N-1)$ rows having the highest occurrence counts is considered and a compression ratio is calculated. A compression ratio, based on bit counts, is as follows:

$$\frac{(X+Y) \cdot PatternSize}{(X \cdot TagSize) + Y \cdot (TagSize + PatternSize) + (2^N - 1) \cdot PatternSize}$$

where: X is the sum of all occurrence counts in the selected row; Y is the sum of all occurrence counts in the non-selected rows; PatternSize is the quantity of bits in the pattern (i.e. code block); and TagSize is the quantity of bits in the tag value, assuming all tag values (including the special value) are of the same size.

At step 430, the compression ratio obtained in step 420 is compared to a minimum. If a desirable compression ratio is found (one that meets or exceeds the minimum), then control passes to step 432 where rows of the TABLE are defined.

Otherwise, control passes to step 440.

At step 440, the loop variable is tested against an upper limit, for example 8. The upper limit is selected to optimize the size and speed of operation of secondary cache 218. The upper limit may be any convenient maximum number, for example, between 4 and 40. If the loop variable has not reached the upper limit, it is incremented at step 444 and control passes to the top of the loop. Otherwise, the address range submitted for analysis in step 412 is designated as not compressed, meaning that compression criteria do not meet system design criteria. Compression criteria may include, for example, the size of the address range, the selected compression algorithm, the pattern size, and the size of a TABLE of entries for decompression. In a preferred variation, when control passes to step 442, another set of compression criteria is determined and method 400 is repeated until a desirable compression ratio is obtained. For example, the quantity of tag values may be increased with commensurate increase in the number of rows in the TABLE. In another variation the instructions in the address range are modified or reorganized to increase recurrence of code block values in a particular address range.

The foregoing description discusses preferred embodiments of the present invention which may be changed or modified without departing from the scope of the present invention. For example, in one variation decompression does not necessarily produce a contiguous series of instructions but rather produces a stream of instructions expected to be requested. The series is selected by analysis of program execution, for example, for a desired mix of functions, commonly occurring input data, or anticipated environmental conditions.

In another variation the secondary cache hit rate is about 90% to 95%.

The sizes of memories in this configuration include ROM 108 at about 8 Mbytes, RAM 112 at about 8 Mbytes, level 1 instruction cache within the processor 960 megacell at about 16K bytes, SRAM 216 at about 81K bytes to 32K bytes (16K bytes preferred), SRAM 224 at about 4K bytes to 256K bytes (64K bytes preferred), and DRAM 226 at about 512K bytes. Page mode read and write operations stream 512 bytes per operation. The pattern size for this configuration is 32 bits wide. When the same cycle time is used to read memory 230 and write DRAM 226, the ratio of the width of line 219 to line 205 (e.g., 128/32) may be just greater than the compression ratio.

These and other variations and modifications are intended to be included within the scope of the present invention. While for the sake of clarity and ease of description, several specific embodiments of the invention have been described; the scope of the invention is intended to The measured by the claims as set forth below.

What is claimed is:

1. A printer comprising:

a. a memory that stores a program, the program being in compressed form;

b. a buffer for receiving input data from a provided computer;

c. a formatter, coupled to the memory and to the buffer, wherein the formatter determines an image in response to the input data, the formatter comprising:

(1) a decompressor that receives at least a portion of the program from the memory and that decompresses the portion to provide an instruction;

(2) a cache that receives and stores the instruction; and (3) a processor that receives the instruction from the cache and that determines the image by executing the instruction; and d. a print engine that prints the image.

2. The printer of claim 1 wherein the formatter comprises an integrated circuit comprising the decompressor, the cache, and the processor.

3. The printer of claim 2 wherein the cache comprises a dynamic random access memory array.

4. The printer of claim 2 wherein the cache comprises an array for storing the instruction.

5. The printer of claim 1 wherein the decompressor provides the instruction according to a Huffman algorithm.

6. The printer of claim 1 wherein the decompressor provides the instruction according to an LZW algorithm.

7. The printer of claim 1 wherein:

a. the portion comprises a predetermined plurality of read cycles of the memory;

b. the memory has a page mode for read access; and c. the plurality is provided during an uninterrupted page mode access.

8. The printer of claim 1 wherein:

the processor provides an address for fetching the instruction;

the cache provides the instruction in response to the address, the cache further comprising a first cache memory; and the decompressor reads a table and an information block from the memory that stores the program, wherein:

(a) the table comprises a plurality of rows, each row corresponding to a respective tag value of a series of tag values, each row identifying a respective code block value;

(b) the information block comprises a data item; and (c) the decompressor stores in the first cache memory a first copy of the respective code block value of a row of the table, wherein:

1) the respective tag value of the row is identified in response to the data item;

2) the first copy comprises the instruction; and 3) the code block value comprises more bits than the data item.

9. The printer of claim 8 wherein the first cache memory comprises a dynamic random access memory.

10. The printer of claim 9 wherein the cache further comprises a second cache memory and the decompressor stores the table in the second cache memory.

11. The printer of claim 10 wherein the second cache memory comprises a static random access memory.

12. The printer of claim 11 further comprising:

a. a third cache memory; and b. a cache controller that reads the first copy from the first cache memory and stores a second copy of the instruction in the third cache memory for access by the processor.

13. The printer of claim 8 wherein the decompressor reads a map from the memory that stores the program and reads the information block from the memory that stores the program in response to the map.

14. The printer of claim 13 wherein the cache further comprises a second cache memory and the decompressor stores the map in the second cache memory.

15. The printer of claim 14 wherein the second cache memory comprises a static random access memory.

16. The printer of claim 8 wherein:

a. the first cache memory comprises a dynamic random access memory;

b. the cache further comprises:

(1) a second cache memory comprising static random access memory;

(2) a third cache memory; and (3) a cache controller that reads the first copy from the first cache memory and stores a second copy of the executable instruction in the third cache memory for access by the processor; and c. the decompressor reads a map from the memory that stores the program, the decompressor stores the table and the map in the second cache memory, and reads the information block from the memory that stores the program in response to the map.

17. A printer comprising:

a. a memory that stores a program, the program being in compressed form;

b. a buffer for receiving input data from a provided computer;

c. a formatter, coupled to the memory and to the buffer, the formatter being coupled to the memory by a first bus having a first width, wherein the formatter determines an image in response to the input data, the formatter comprising an integrated circuit comprising:

(1) a decompressor that receives at least a portion of the program from the memory and that decompresses the portion to provide an instruction;

(2) a cache that receives and stores the instruction, the cache comprising an array, the cache being coupled to the decompressor by a second bus having a second width, the first width being less than the second width; and (3) a processor that receives the instruction from the cache and that determines the image by executing the instruction; and d. a print engine that prints the image.

18. The printer of claim 17 wherein the cache comprises a dynamic random access memory array.

* * * * *